Milton M. Metcalf.
INVENTOR

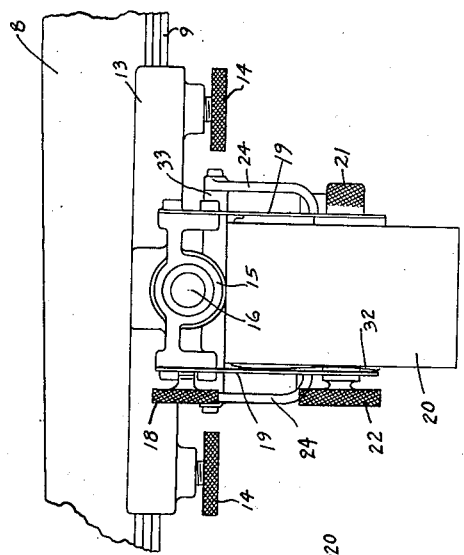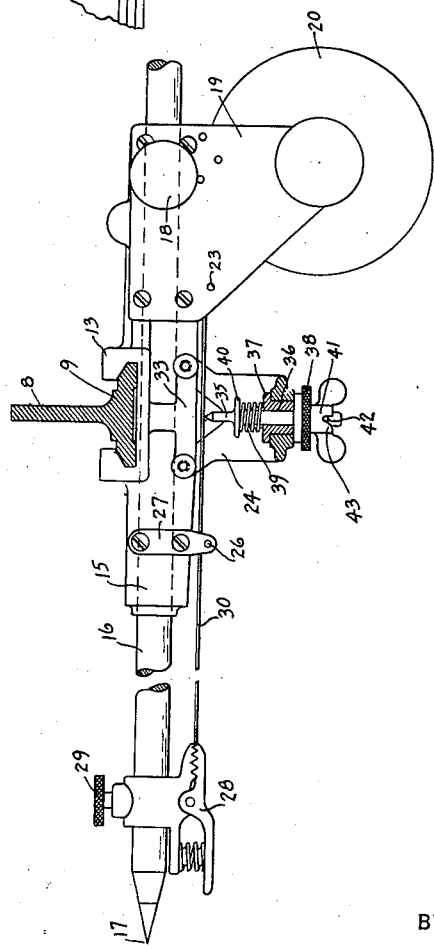

Patented Oct. 26, 1937

2,096,752

UNITED STATES PATENT OFFICE 2,096,752

PROPELLER PITCH MEASURING DEVICE

Milton M. Metcalf, Vallejo, Calif.

Application October 27, 1931, Serial No. 571,443

10 Claims. (Cl. 33—174)

(Granted under the act of March 3, 1883, as amended April 30, 1928; 370 O. G. 757)

My invention relates to a device for recording the readings of a propeller measuring machine.

The object hereof is to provide an attachment for a known type of machine for measuring the pitch of propeller blades whereby the readings of said machine may be readily made into a permanent record, from which the desired data may be accurately and quickly obtained.

In the drawings:

Fig. 1 indicates in broken lines the propeller shaft and shows in full lines a novel combination embodying my invention in position thereon;

Fig. 2 is a view of my new measuring and recording attachment taken from above and at right angles to Fig. 1 with the supporting arm shown in section;

Fig. 3 is an end view of the right-hand part of Fig. 2.

Figure 1:
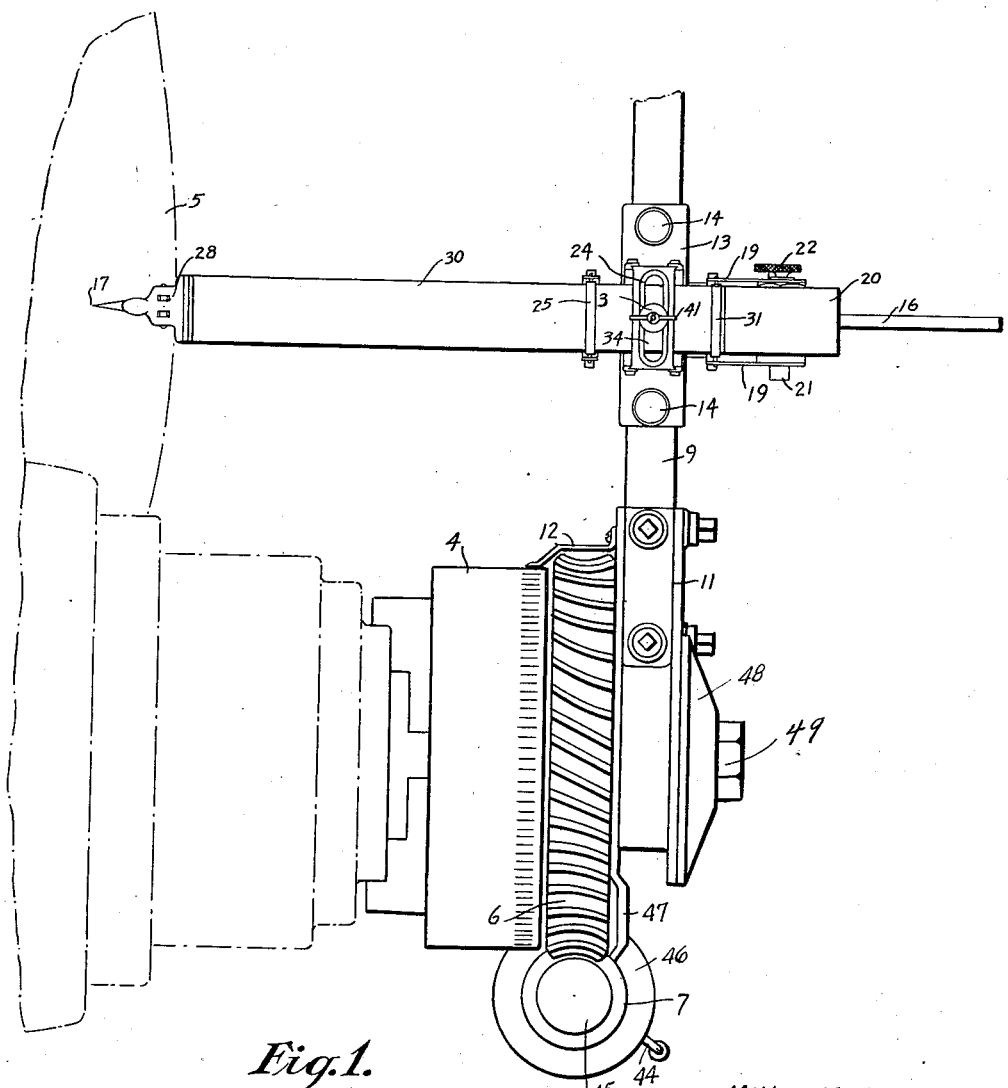

The propeller pitch measuring machine comprises a drum 4 adapted to be fixedly mounted co-axially with the shaft of a propeller having blades 5, one edge of the periphery of the drum being graduated in units representing equal magnitudes of angles of arc. It is obvious that the propeller shaft remains stationary throughout the making of the measurements herein contemplated. A worm gear 6 is mounted adjacent drum 4 in normally fixed relation thereto but is releasable by loosening bolt 49 to permit rotation of gear 6 (and head 11 carrying the recorder assembly) with respect to drum 4 for purpose of initial adjustment to any particular propeller blade. Tightening thereafter of bolt 49 to clamp gear 6 and drum 4 together against the propeller shaft permits the setting of the device for the measurement of angles across the face of a propeller blade by rotating shaft 45 as hereinafter described. Worm 7 is rotatably mounted in brackets 47 fixed to a head 11 that is rotatable co-axially with the propeller shaft and with drum 4, on a sleeve (not shown) carried by worm gear 6 and concentric therewith. The worm 7 is meshed with worm gear 6 which is fixed, and therefore when the worm is rotated by crank 44 secured on the shaft 45 of worm 7, the worm travels around gear 6 and the head 11 also is rotated. An index 12 fixed to head 11 cooperates with the graduations on drum 4 to indicate the magnitude of angular movement of head 11. A bolt 49 co-acts with drum 4 to secure the disc 48, which has a working fit with head 11 to permit rotation thereof but prevents axial movement thereof.

Secured to head 11 to rotate therewith is an arm 8 having a face that lies along a radius of head 11, the arm 8 being a T-bar and the said face being the outer surface of the cross flange 9 thereof. A slide 13 is mounted on flange 9 and is provided with screws 14 whereby the slide may be firmly clamped along arm 8. A sleeve 15 in which measuring rod 16 is slidable is carried by slide 13. Rod 16 will preferably be graduated in units of length and has a point 17 on the axis of the rod to contact the surface of the propeller blade. Screw 18 is threaded into sleeve 15 and bears against rod 16 to fix the rod in any desired position.

It is frequently necessary in shipyards and docks to determine the pitch of the blades of a vessel's propeller and it is desirable that the data then taken be preserved in permanent form. The subject device not only makes a permanent record simultaneously with taking the reading, but will take and preserve a record of the magnitude, form and location of any distortion in the blades of a propeller that has been damaged.

Hanger plates 19 are secured to sleeve 15 at that end of the sleeve most distant from point 17, and serve as supports for a spindle on which a spool with a roll 20 of strip paper is rotatable. The cap nut 21 and screw 22 on the ends of the spindle hold the spindle in place in the hanger plates but make it readily removable therefrom. The paper 30 from roll 20 passes over a roller 31 on pins 23 in plates 19, laterally through bracket 24, over a roller 25 on pins 26 in straps 27, and the end of the strip is gripped by the jaws of clip 28, the clip being mounted on rod 16 near the pointed end thereof and held in place by screw 29 bearing against the rod. A flat spring 32 is bent to bear against one of the plates 19 and the spool on which paper roll 20 is carried to insure that the paper 30 will be kept under enough tension to avoid sagging or slack in the paper strip 30, which would result in inaccurate spacing of the record marks thereon.

Bracket 24 is secured at four points to arms 33 that extend out from slide 13 to insure rigidity. A longitudinal slot 34 is formed in the body of the bracket and in this slot is mounted a recording stylus 35, herein shown as a pointed pin adapted to pierce the paper 30, but it may be a pen or pencil if found preferable. Stylus 35 is slidable through a bushing 36 that has a flange 37 at one end to bear against the bracket on each side of slot 34 and is threaded at the other end to receive a nut 38 whereby the bushing may be clamped in position on the bracket. Spring 39 is held under compression between bushing 36 and flange 40 on stylus 35 to project the stylus against paper 30, the stylus being normally held away from the paper by rotating wing sleeve 41 to cause pin 42 through the shank of the stylus to ride up the sloping face 43 of a slot in the sleeve 41 to the outer end face of the sleeve.

The mode of operation is as follows:

The machine is mounted with the drum 4 coaxial with the propeller shaft, slide 13 is moved along arm 8 to the desired radial distance, and arm 8 is turned by rotating shaft 45 to be in line with the nearest edge of the propeller blade to be measured, the reading of index 12 on drum 4 being noted. The paper 30 is attached to clip 28 and the rod 16 is moved into contact with the nearest edge of the blade, and a mark is recorded on the paper by turning wing sleeve 41 to permit pin 42 to move into slot 43, thus leaving stylus 35 free to be moved by spring 39 to puncture the paper. Arm 8 is then rotated 5° or whatever angular interval has been selected, by means of shaft 45, worm 7, and gear 6, the angular movement being read on drum 4 against index 12, rod 16 is again moved into contact with the blade and the new reading recorded on paper 30. This is continued clear across the blade on each radius of as many radii as may be necessary to get sufficiently complete data. It is to be understood that the member 16 is moved toward the blade only while making a record. When it is desired to make two records side by side, the strip 30 is rerolled on roll 20 by rotating the roll manually while the member 16 is being moved away from the blade.

The pitch is measured directly from the paper, the distance between each two marks thereon being the advance for the chosen angular interval. The sum of the distances measured being the advance or pitch for the total number of degrees included at any given radius, a special scale can be made to read the pitch directly in feet, or it can be computed from the formula:

$$\frac{360°}{X°} \times \frac{P}{12} = \text{pitch in feet}$$

in which P is the advance in inches over an angle X°, at that radius. The average of the values obtained by a repetition of the above at several radii will give the average pitch for the blade, and the average of the values for the several blades will give the average pitch for the propeller as a whole.

If desired for purposes of comparison or any other reason, a record across a blade at one radius may be impressed upon the paper strip 30 and then, by re-rolling the strip upon the roll and moving the stylus to a different position in slot 34, the record of the same blade at a different radius may be made alongside the first record; or such second record may be made on a different blade at the same radius as on the first one or at a different radius thereon.

It will be understood that the above description and accompanying drawings comprehend only the general and preferred embodiment of my invention and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon.

I claim:

1. The combination with a circular member graduated in angles, of an arm extending radially thereof and mounted to rotate about the axis thereof, an index carried by said arm to cooperate with said graduated member, a slide movable longitudinally on said arm, a sleeve fixed to said slide transversely thereof, a pointed rod slidably mounted in said sleeve, hanger plates fixed to said sleeve adjacent one end thereof, a roll of paper rotatably mounted between said plates, a clip adapted to grip the paper of said roll mounted on said rod adjacent the pointed end thereof, rollers over which the paper passes between said clip and said roll, a bracket secured to said slide to span the said paper, said bracket having a slot that extends transversely of said paper, a bushing in said slot, means to fix said bushing in place on said bracket, a stylus extending through said bushing, a pin through the shank of said stylus, a wing sleeve on said shank having a slot with a sloping side to coact with said pin to withdraw said stylus, and a spring under compression between said bushing and a flange on said stylus to project said stylus inwardly.

2. The combination with a circular member graduated in angles, of an arm extending radially thereof and mounted to rotate about the axis thereof, an index carried by said arm to cooperate with said graduated member, a slide movable longitudinally on said arm, a sleeve fixed to said slide transversely thereof, a pointed rod slidable in said sleeve, a strip of material adapted to have a permanent record made thereon carried from said sleeve, a clip adapted to grip one end of said strip mounted on said rod adjacent the pointed end thereof, a bracket disposed astride of said strip, a stylus mounted in said bracket to be movable transversely of said strip, resilient means to project said stylus inwardly toward said strip, a pin through the shank of said stylus, and a member having a sloping face adapted to coact with said pin to withdraw said stylus from said strip.

3. The combination with a circular member graduated in angles, of an arm extending radially thereof and mounted to rotate about the axis thereof, an index carried by said arm to cooperate with said graduated member, a slide movable longitudinally on said arm, a sleeve fixed to said slide transversely thereof, a pointed rod slidable in said sleeve, means fixed to said sleeve to carry a strip of material adapted to have a record made thereon, a clip fixed to said rod adjacent the pointed end of said rod to grip said strip, a supporting member astride said strip, a stylus mounted on said supporting member to be movable transversely of said strip, means to move said stylus inwardly to said strip, and other means to move said stylus outwardly away from said strip.

4. The combination with a circular member graduated in angles, of an arm extending radially thereof and mounted to rotate about the axis thereof, an index carried by said arm to cooperate with said graduated member, a member movable longitudinally on said arm, a sleeve fixed to said movable member transversely thereof, a pointed rod slidable in said sleeve, means fixed to said sleeve to carry a strip of material adapted to have a record made thereon, a gripping device fixed to said rod adjacent the pointed end thereof to hold an end of said strip, and a stylus mounted to be movable into contact with said strip and away from said strip.

5. The combination with a device having a graduated circular member, of a rotatable arm extending radially thereof, an index carried by said arm to cooperate with said graduated member, a member movable longitudinally on said arm, a sleeve fixed to said movable member transversely thereof, a rod slidable in said sleeve, material adapted to have a record made thereon operatively related to said sleeve and connected to be moved by movement of said rod, and a movable stylus to form a record on said material.

6. The combination with a device having a graduated circular member, of an arm extending radially thereof, an index carried by said arm to cooperate with said graduated member, a member movable longitudinally on said arm, an element carried by said movable member and slidable transversely of said member, material adapted to have a record made thereon operatively related to said movable member to be shifted by movement of said element, and means to make a record on said material.

7. In a device of the class described, the combination with a drum adapted to be secured to a propeller shaft coaxially therewith and having its periphery graduated adjacent one edge, of a worm gear coaxial with said drum and normally non-rotatable with respect thereto, an arm head coaxial with said gear and mounted for rotation with respect to said gear, a worm carried by said head in mesh with said gear, means to rotate said worm, an index carried by said head extending over the graduations on said drum, an arm extending radially from said head, a slide on said arm, means to clamp said slide to said arm, a sleeve carried by said slide extending parallel to the axis of rotation of said head, a pointed rod slidably mounted in said sleeve, means to clamp said rod in position in said sleeve, means to clamp said gear against rotation with respect to said drum and means to make a record of the position of said rod in said slide.

8. In a device of the class described, the combination with a drum adapted to be secured to a propeller shaft coaxially therewith and having its periphery graduated adjacent one edge, of a worm gear coaxial with said drum and normally non-rotatable with respect thereto, an arm head coaxial with said gear and mounted for rotation with respect to said gear, a worm carried by said head in mesh with said gear, means to rotate said worm, an index carried by said head extending over the graduations on said drum, an arm extending radially from said head, a member extending parallel to said propeller shaft and mounted to be moved along said arm, said member being itself longitudinally slidable and means to make a record of the relative position of said member.

9. In a device of the class described, the combination with a member graduated in units of angle and adapted to be fixed to a propeller shaft coaxially therewith, of a second member rotatable with respect thereto, an index carried by said second member to extend over the said graduations, a radially extending arm carried by said second member, a slide on said arm, means to clamp said slide to said arm, a sleeve carried by said slide extending parallel to said propeller shaft, a pointed measuring rod slidably mounted in said sleeve, means to clamp said rod in position in said sleeve and means to make a record of the position of said rod in said slide.

10. In a device of the class described, the combination with a drum adapted to be secured to a propeller shaft coaxially therewith and having its periphery graduated adjacent one edge, of a worm gear coaxial with said drum and normally non-rotatable with respect thereto, an arm head coaxial with said gear and mounted for rotation with respect to said gear, a worm carried by said head in mesh with said gear, means to rotate said worm, an index carried by said head extending over the graduations on said drum, an arm extending radially from said head, a member extending parallel to said propeller shaft and mounted to slide longitudinally of said arm, said member being itself slidable parallel to its own length transversely of said arm, and means to record the distances said pointed rod is slid transversely of said arm.

MILTON M. METCALF.